United States Patent Office 3,378,571
Patented Apr. 16, 1968

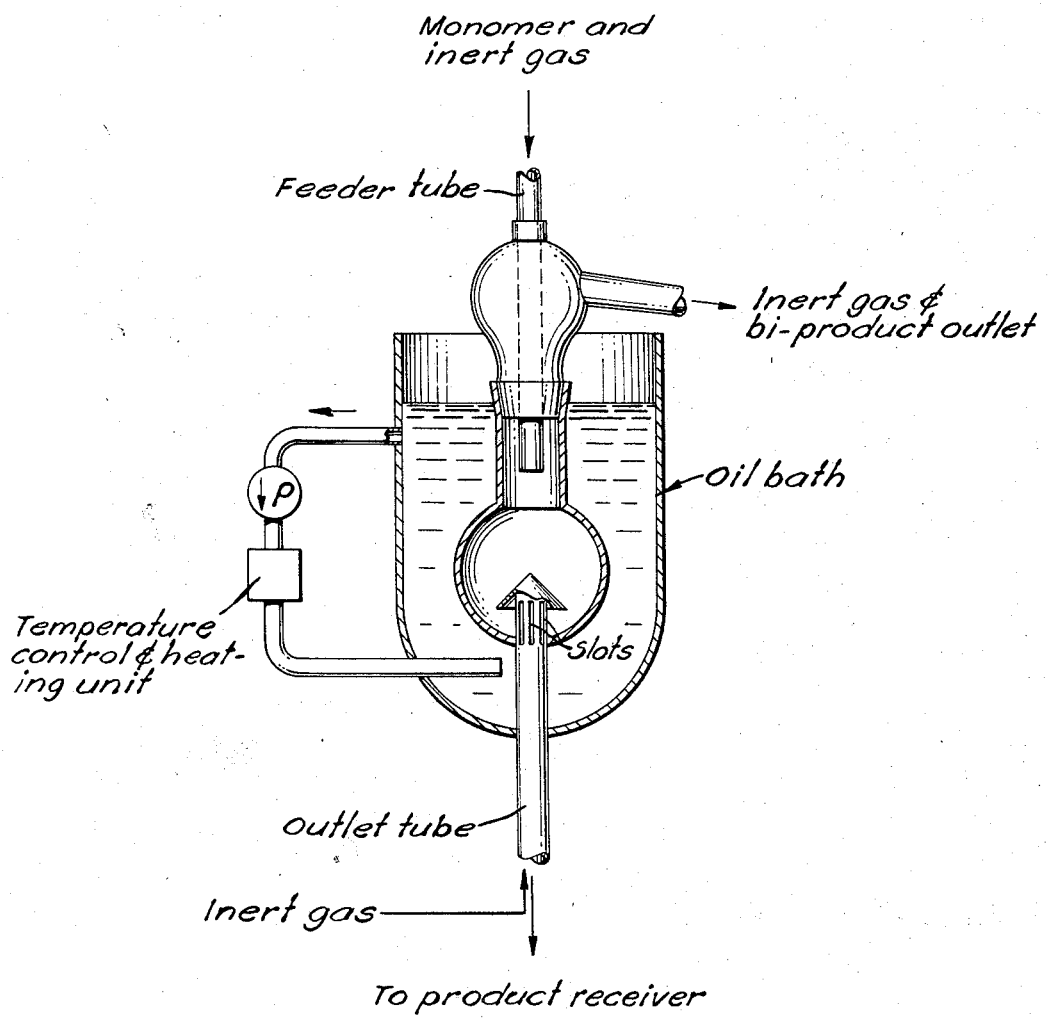

3,378,571
HIGH NITROGEN POLYMERS AND PROCESS
FOR PREPARATION THEREOF
Ernst J. Peterli, Pleasant Hill, Calif., assignor to The Dow Chemical Company, Midland, Mich., a corporation of Delaware
Filed Jan. 24, 1962, Ser. No. 169,176
6 Claims. (Cl. 260—349)

ABSTRACT OF THE DISCLOSURE

A novel process for preparing polymers having a high nitrogen content and N/C ratios greater than 1 which comprises passing an amine based compound corresponding to the formula

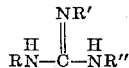

wherein R, R' and R" are either —H or —NH$_2$, monoazide salts of such compounds or mixtures thereof into a reaction zone at from about 150 to about 259° C. and having an inert atmosphere thereby pyrolyzing said amine and autocondensing it into the corresponding polymer in liquid form and removing said liquid polymer from said reaction zone. These polymers are useful as nitrogen oxidizer source materials in the "B-N" propellant system, as gas generators, and as binders in conventional propellant systems.

---

This invention relates to a process for preparing high nitrogen polymers and more particularly is concerned with a pyrolysis process for condensing amine compounds having a high nitrogen content and to new polymers prepared by this process.

In certain advanced propellant systems in which the energy is derived from reactions other than the formation of carbon dioxide, carbon monoxide and water, a binder having a high nitrogen content is desired. This is particularly true in B-N systems; i.e. those employing a boron based fuel and nitrogen oxidizing source material in which the energy released in the production of boron nitride supplies the energy to expand low molecular weight gases thereby giving high specific impulses as disclosed in a copending application Ser. No. 846,509 filed Oct. 14, 1959. In other systems, nitrogen acts as a driving fluid where it both contributes to the impulse and lowers combustion chamber temperature.

Known nitrogen containing polymers, e.g. poly(ethylene hydrazine), polyurethane etc. contain less than 50 percent by weight nitrogen and have an undesirably low N/C ratio of 1 or less. On the other hand, autocondensation polymers of triaminoguanidinium azide and the like have desirably high nitrogen contents of 70 percent or more by weight and N/C atom ratios of about 3 or more. Further, such autocondensation polymers are more energetic than the known nitrogen containing polymers such as those listed hereinbefore. To illustrate, the heat of formation of one particular condensation polymer of triaminoguanidinium azide is about 49 kilocalories per 100 grams while that of conventional binders, such as the polyurethanes, is about zero or even a negative value.

Heretofore, however, the autocondensation of the high nitrogen amines to the corresponding polymer has been unsuccessful since the reaction is strongly exothermic and explosions resulted in preparing batches containing as little as 30 grams of the monomer material. Further, with conventional lengthy high temperature processing techniques on smaller batches the product obtained was a carbonaceous mass having a low nitrogen content. Now, unexpectedly it has been found that autocondensation of high nitrogen amine based materials can be achieved by continuously feeding the monomer into a reaction zone maintained under specified temperature conditions and removing the polymer from this zone as it is produced.

In carrying out the instant process a high nitrogen amine, e.g., triaminoguanidinium azide is continuously fed into a heated reaction zone maintained at from about 150 to about 250° C. Ordinarily the reaction temperature will be maintained at from about 180 to about 210° C. and preferably the reaction will be carried out at from about 190 to about 200° C. At temperatures higher than indicated, loss of nitrogen from the polymer occurs and at temperatures lower than about 150° C. the rate of the autocondensation is very slow.

The amine material is passed through the heated reaction zone, being pyrolyzed therein to the corresponding polymer, and the resulting liquid polymer as produced then is fed almost immediately, and in any event prior to the time any substantial degradation of the polymer has occurred, into a cool receiving flask. The actual residence time of the liquid polymer in the heated reaction zone can be from about 30 seconds to about 10 minutes or more and ordinarily is from about 1 to about 5 minutes. Conveniently, the amine based reactant and subsequently the polymeric product passes through the reactor by gravity flow. Therefore, for any given reactor the product residence time in the heated zone will be dependent to some extent on the size of the vessel employed.

The reaction can be carried out at atmospheric pressure or alternatively if desired at reduced pressures.

Amine materials which can be polymerized to the corresponding homopolymer by the instant process are those materials having the general formula:

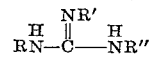

and the monoazide salts of these compounds wherein R, R' and R" are members independently selected from the group consisting of H and —NH$_2$. Representative examples of amines and amine azides which can be autocondensed by the instant process are triaminoguanidine and its azide salt, guanidine azide, monoaminoguanidine azide and the like. By passing a mixture of the amine based monomers through the reactor copolymers are obtained.

One embodiment of an apparatus for carrying out the instant process is shown schematically in the figure. With this apparatus a reactor vessel fitted with a removable feed line in its top and a fixed, slotted, roofed exit tube in its bottom is positioned inside a heating vessel, such as a thermostatically controlled, circulating oil bath. The exit tube in the bottom of the reaction vessel also is fixed into and passes through the bottom of the heating vessel. As indicated, the feeder line passes through a gas outlet tube, which in turn is connected directly to the top of the reaction vessel. The monomer storage vessel is equipped with an entry tube for introducing an inert gas such as nitrogen or argon, for example, therein. This serves to blanket the amine based monomer while in storage and as it passes into the reactor. In addition it provides an inert atmosphere for the reaction system and also serves to remove gaseous byproducts, for example, nitrogen, ammonia and ammonium azide from the reaction zone. As the amine material passes down through the heated reactor it is pyrolyzed into the corresponding polymer. This polymeric product, being a liquid at the reaction temperatures, flows through the slots in the product outlet tube and into a cool receiver, maintained at about room temperature or lower.

The following examples will serve to further illustrate the present invention but are not meant to limit it thereto.

Example 1

Using an embodiment of the apparatus substantially the same as described hereinbefore, a stream of triaminoguanidine azide was gravity fed at atmospheric pressure under a nitrogen blanket by means of a feed tube from a storage vessel into a glass reaction vessel which was maintained at about 180° C. The amine monomer was stored in a glass bottle mounted on a vibrator and positioned above the reaction vessel. The reaction vessel was heated by immersion in a thermostatically controlled, agitated silicone oil bath. As the liquid autocondensation polymer was formed, it flowed through the slots into the outlet tube at the bottom of the reactor vessel and on down into a cold receiver also blanketed with nitrogen. The portion of the outlet tube below the bottom of the oil bath was wrapped with heating tape and kept above 100° C. to assure there was no solidification and build up of solidified product in this tube.

Several hundred grams of the new polymer poly(triaminoguanidinum azide) were prepared in this run with no evidence of any undesirable explosion or autodecomposition of the high nitrogen polymer.

The product was gray in color, very hydroscopic and decomposed slowly in air, but was stable when stored under substantially moisture-free nitrogen. It was pliable at room temperature and at about 80° C. was soft enough for working and readily could be mixed into a propellant composition. Elemental analysis of the product indicated C–19.8 percent, H–5.4 percent, N–74.0 percent, thus showing a N/C atom ratio for the polymer of 3.2. The measured heat of formation was +49 kilocalories per 100 grams. This polymer is useful as an oxidizing nitrogen source material in a "B-N" propellant system.

Example 2

A number of tests were made utilizing the same apparatus, starting material and procedure as described for Example 1. However, in these tests, the reaction temperatures were varied and the system was maintained under predetermined reduced pressures. The resulting new and novel poly(triaminoguanidinium azide) polymers were light brown in color and had a lower melting point than the product prepared at atmospheric pressure as described in Example 1. Table I, which follows, summarizes the results of these tests.

TABLE I

| Run No. | Reaction temp., ° C. | Reaction Pressure [1] | Product Elemental Analysis, Weight Percent | | | N/C atom ratio |
|---|---|---|---|---|---|---|
| | | | C | H | N | |
| 1 | 250 | 12 | 22.6 | 5.0 | 72.6 | 2.8 |
| 2 | 225 | 12 | 18.5 | 5.4 | 76.0 | 3.5 |
| 3 | 185 | 20 | 14.6 | 5.3 | 79.6 | 4.7 |
| 4 | 185 | 10 | 13.2 | 6.1 | 79.3 | 5.1 |
| 5 | 190 | 11 | 13.6 | 6.0 | 80.1 | 5.0 |
| 6 | 190 | 11 | 13.9 | 5.8 | 79.0 | 4.9 |

[1] Inches Hg below atmospheric.

In a manner similar to that described for the foregoing examples, guanidine azide can be autocondensed by the instant method at a temperature of about 250° C. and at atmospheric pressure. Diaminoguanidine azide is polymerized into the corresponding polymer by the instant process at a temperature of about 150° and atmospheric pressure. Also triaminoguanidine can be polymerized by the instant process.

These polymers are useful as nitrogen oxidizer source materials in the "B-N" propellant system, as gas generators and as binders in conventional propellant systems.

Various modifications can be made in the present invention without departing from the spirit or scope thereof for it is understood that I limit myself only as defined in the appended claims.

I claim:

1. A process for preparing polymers having a high nitrogen content and a N/C ratio greater than 1 which comprises; passing a compound selected from the group consisting of amine based compounds having the formula:

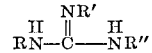

the monoazide salts of said amine based compounds and mixtures thereof wherein R, R' and R'' are members independently selected from the group consisting of —H and —NH$_2$, into a reaction zone maintained at from about 150 to about 250° C. and having an inert atmosphere thereby pyrolyzing said high nitrogen compound and autocondensing it into the corresponding polymer in a liquid form, and, removing the liquid polymer from said reaction zone as it is produced and prior to the time it has undergone any substantial undesirable degradation.

2. The process as defined in claim 1 and including the step of cooling said polymer into the solid state after it has been removed from the reaction zone.

3. The process as defined in claim 1 wherein the reaction zone is maintained at a temperature of from about 190 to about 200° C.

4. The process as defined in claim 1 wherein the residence time of the polymer in the heated reaction zone is from about 30 seconds to about 10 minutes.

5. A process of preparing poly(triaminoguanidine·azide) which comprises; passing triaminoguanidine azide carried in a stream of an inert gas into a reaction zone maintained at from about 180 to about 210° C. thereby autocondensing said triaminoguanidine azide into the corresponding polymer in a liquid form, removing said liquid polymer from said reaction zone prior to the time any substantial amount of decomposition has occurred, and cooling said polymer into the solid state.

6. A homopolymer having a high nitrogen content and a N/C ratio greater than 1, said homopolymer prepared by the process of passing a compound selected from the group consisting of a high nitrogen amine based compound having the formula

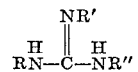

wherein R, R' and R'' are members independently selected from the group consisting of —H and —NH$_2$ or a monoazide salt of said high nitrogen amine based compound into a reaction zone having an inert atmosphere and maintained at from about 150 to about 250° C., pyrolyzing said compound and autocondensing it in said reaction zone over a period of from about 30 seconds to about 10 minutes into the corresponding homopolymer in a liquid form, removing said liquid homopolymer from said reaction zone as it is produced and cooling said homopolymer into the solid state.

References Cited

UNITED STATES PATENTS 2,474,909  7/1949  Oplin et al. _____ 260—2
2,325,586  4/1943  Bolton et al. _____ 260—2

JOHN D. RANDOLPH, *Primary Examiner.*

L. D. ROSDOL, C. D. QUARFORTH, WALTER A. MODANCE, *Examiners.*

C. M. SHURKO, J. W. WHISLER, *Assistant Examiners.*